US 12,385,821 B2

(12) United States Patent
Berezhnyy et al.

(10) Patent No.: US 12,385,821 B2
(45) Date of Patent: *Aug. 12, 2025

(54) FLOW CYTOMETERS INCLUDING LIGHT COLLECTION ENHANCERS, AND METHODS OF USING THE SAME

(71) Applicant: Becton, Dickinson and Company, Franklin Lakes, NJ (US)

(72) Inventors: Ihor V. Berezhnyy, Los Gatos, CA (US); Geoffrey Osborne, Bellbowrie (AU)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/600,000

(22) Filed: Mar. 8, 2024

(65) Prior Publication Data
US 2024/0272061 A1    Aug. 15, 2024

Related U.S. Application Data

(63) Continuation of application No. 17/568,470, filed on Jan. 4, 2022, now Pat. No. 11,959,849.
(Continued)

(51) Int. Cl.
G01N 15/14       (2024.01)
G01N 15/1434     (2024.01)
G01N 15/10       (2006.01)

(52) U.S. Cl.
CPC ..... G01N 15/1436 (2013.01); G01N 15/1459 (2013.01); G01N 2015/1006 (2013.01); G01N 2015/1452 (2013.01)

(58) Field of Classification Search
CPC .......... G01N 15/1436; G01N 15/1459; G01N 2015/1006; G01N 2015/1452; G01N 15/1434
See application file for complete search history.

(56) References Cited

U.S. PATENT DOCUMENTS 5,471,294 A     11/1995  Ogino
5,737,078 A *   4/1998   Takarada ........... G01N 15/1459
                                              356/336
(Continued)

FOREIGN PATENT DOCUMENTS

JP      2005055876 A       9/2006
JP      2006250685 A       9/2006
WO      WO2015073911 A1    5/2015

OTHER PUBLICATIONS

Fox, et al. "Enhanced LiCghytto Cmoeltleerc tion in a Flow 1, 2", Cytometry, vol. 1, No. 1, 1980, pp. 21-25.
(Continued)

Primary Examiner — Roy M Punnoose
(74) Attorney, Agent, or Firm — Bret E. Field; BOZICEVIC, FIELD & FRANCIS LLP

(57) ABSTRACT

Flow cytometers including light collection enhancers are provided. In embodiments, the subject flow cytometers include a flow cell, a light source, an objective lens for focusing particle-modulated light propagating within a first light collection cone and a light collection enhancer configured to collect particle-modulated light propagating along an optical path within a second light collection cone and redirect the collected light such that it is back-propagated along the same optical path and focused by the objective lens for detection. Light collection enhancers of interest include a reflective optical element (e.g., a mirror) and a condenser lens positioned between the reflective optical element and the flow cell. Methods for analyzing a sample are also provided.

20 Claims, 9 Drawing Sheets

Related U.S. Application Data

(60) Provisional application No. 63/136,906, filed on Jan. 13, 2021.

(56) References Cited

U.S. PATENT DOCUMENTS

| | | | |
|---|---|---|---|
| 2009/0091746 A1* | 4/2009 | Fukuda | G01N 15/1434 |
| | | | 356/73 |
| 2009/0153857 A1 | 6/2009 | Matsuda | |
| 2012/0274925 A1 | 11/2012 | Chen | |
| 2014/0295536 A1 | 10/2014 | Yamada | |
| 2019/0049374 A1 | 2/2019 | Nishihra et al. | |
| 2022/0120658 A1* | 4/2022 | Shan | G01N 15/1436 |
| 2022/0155210 A1* | 5/2022 | Berezhnyy | G01N 15/1459 |

OTHER PUBLICATIONS

Llobera, et al. "Multiple internal reflection poly(dimethylsiloxane) systems for optical sensing", The Royal Society of Chemistry, Lab Chip, 2007, 7, 1560-1566.

Skogen-Hagenson, et al. "A High-Efficiency Flow Cytometer", Journal of Histochemistry & Cytochemistry, vol. 25, No. 7, pp. 784-789, 1977.

Watson, "A method for improving light collection by 600% from square cross section flow cytometry chambers", Br. J. Cancer (1985), 51, 433-435.

* cited by examiner

FLOW CYTOMETERS INCLUDING LIGHT COLLECTION ENHANCERS, AND METHODS OF USING THE SAME

CROSS-REFERENCE

Pursuant to 35 U.S.C. § 119 (e), this application claims priority to the filing date of U.S. Provisional Patent Application Ser. No. 63/136,906 filed Jan. 13, 2021; the disclosures of which applications are incorporated herein by reference in their entirety.

INTRODUCTION

The characterization of analytes in biological fluids has become an important part of biological research, medical diagnoses and assessments of overall health and wellness of a patient. Detecting analytes in biological fluids, such as human blood or blood derived products, can provide results that may play a role in determining a treatment protocol of a patient having a variety of disease conditions.

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation. To characterize the components in the flow stream, light must impinge on the flow stream and be collected. Light sources in flow cytometers can vary from broad spectrum lamps, light emitting diodes as well as single wavelength lasers. The light source is aligned with the flow stream and an optical response from the illuminated particles is collected and quantified.

After a particle in the flow stream has been irradiated, side-scattered and fluorescent light is emitted from the particle in all directions. In conventional flow cytometric systems, an objective lens collects the scattered and fluorescent light within a collection cone and focuses the collected light so that it can be detected. However, because side-scattered and fluorescent light is emitted in all directions and typical flow cytometers only collect side-scattered and fluorescent light within a single light collection cone, any side-scattered and fluorescent light propagating outside of that collection cone will not be detected. For example, FIG. 1 depicts a conventional light collection system. A particle 102 is transported in particles stream 101. After it is irradiated, side-scattered and fluorescent light is emitted in all directions. Light propagating within light collection cone 103 is collected by objective lens 104 aligned to optical axis 105 and focused onto light processing module 106. However, light propagating outside of light collection cone 103 is not detected. Similarly, FIG. 2 depicts light collected by a conventional light collection system. As shown in FIG. 2, only side-scattered and fluorescent light within light collection cone 202 is collected and visible in beam profile 203.

SUMMARY

Because conventional particle analysis approaches require that a substantial portion of side-scattered and fluorescent light emitted by a particle in a flow stream is not detected, the inventors have realized that systems and methods for enhancing the collection of particle-modulated light are consequently required. Embodiments of the invention satisfy this need.

Aspects of the invention include flow cytometers having light collection enhancers. In embodiments, the subject flow cytometers include a flow cell for transporting particles in a flow stream, a light source for irradiating the particles in the flow stream at an interrogation point, an objective lens for focusing particle-modulated light propagating within a first light collection cone, and a light collection enhancer for collecting particle-modulated light propagating within a second light collection cone. By "light collection cone", it is meant a conical region located adjacent to the flow cell in which particle-modulated light is focused by an objective lens for detection. As such, particle-modulated light propagating within the first collection cone propagates away from the flow cell in a first direction, while particle-modulated light propagating within the second light collection cone propagates away from the flow cell in a second direction that is distinct from the first direction. The first light collection cone may, for example, be defined by an apex angle ranging from 100 degrees to 120 degrees, while the second light collection cone may be defined by an apex angle ranging from 20 degrees to 100 degrees. In embodiments, the light collection enhancer is configured to collect particle-modulated light propagating along an optical path within the second light collection cone and redirect the collected light such that it is back-propagated along the same optical path and focused by the objective lens. In certain instances, the light collection enhancer includes a reflective optical element and a condenser lens positioned between the reflective optical element and the flow cell. In some cases, the reflective optical element is a mirror (e.g., a flat mirror). The light collection enhancer may, in some embodiments, be positioned on the opposite side of the flow cell relative to the objective lens. In such embodiments, the condenser lens of the light collection enhancer may be positioned along the same optical axis as the objective lens. In some instances, the condenser lens collimates particle-modulated light within the second light collection cone and directs the collimated particle-modulated light to the reflective optical element. The reflective optical element may, in these instances, reflect the particle-modulated light such that the light is back-propagated to the condenser lens and possesses an inverted wavefront. The condenser lens may subsequently focus the back-propagated particle-modulated light onto the interrogation point of the flow cell such that the light is focused by the objective lens.

Aspects of the invention further include methods for analyzing a sample. In embodiments, the subject methods include introducing a biological sample into a flow cytometer having a flow cell for transporting particles in a flow stream, a light source for irradiating the particles in the flow stream at an interrogation point, an objective lens for focusing particle-modulated light propagating within a first light collection cone, and a light collection enhancer for collecting particle-modulated light propagating within a second light collection cone. The first light collection cone may, for example, be defined by an apex angle ranging from 100 degrees to 120 degrees, while the second light collection cone may be defined by an apex angle ranging from 20 degrees to 100 degrees. In embodiments, methods include collecting particle-modulated light propagating along an optical path within a second light collection cone and redirecting the collected light such that it is back-propagated along the same optical path and focused by the objective lens. In certain instances, the light collection enhancer includes a reflective optical element and a condenser lens positioned between the reflective optical element and the flow cell. In some cases, the reflective optical element is a mirror (e.g., a flat mirror). The light collection enhancer may, in some embodiments, be positioned on the opposite side of the flow cell relative to the objective lens. In such embodiments, the condenser lens of the light collection enhancer may be positioned along the same optical axis as the objective lens. In some instances, the condenser lens collimates particle-modulated light within the second light collection cone and directs the collimated particle-modulated light to the reflective optical element. The reflective optical element may, in these instances, reflect the particle-modulated light such that the light is back-propagated to the condenser lens and possesses an inverted wavefront. The condenser lens may subsequently focus the back-propagated particle-modulated light such that the light is focused by the objective lens.

Methods for assembling a flow cytometer are also provided. In embodiments, the subject methods include positioning a light collection enhancer within a flow cytometer having a flow cell for transporting particles in a flow stream, a light source for irradiating the particles in the flow stream at an interrogation point, an objective lens for focusing the particle-modulated light propagating within a first light collection cone and a light collection enhancer. In some cases, methods further include optically aligning the light collection enhancer with the objective lens to assemble the flow cytometer.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
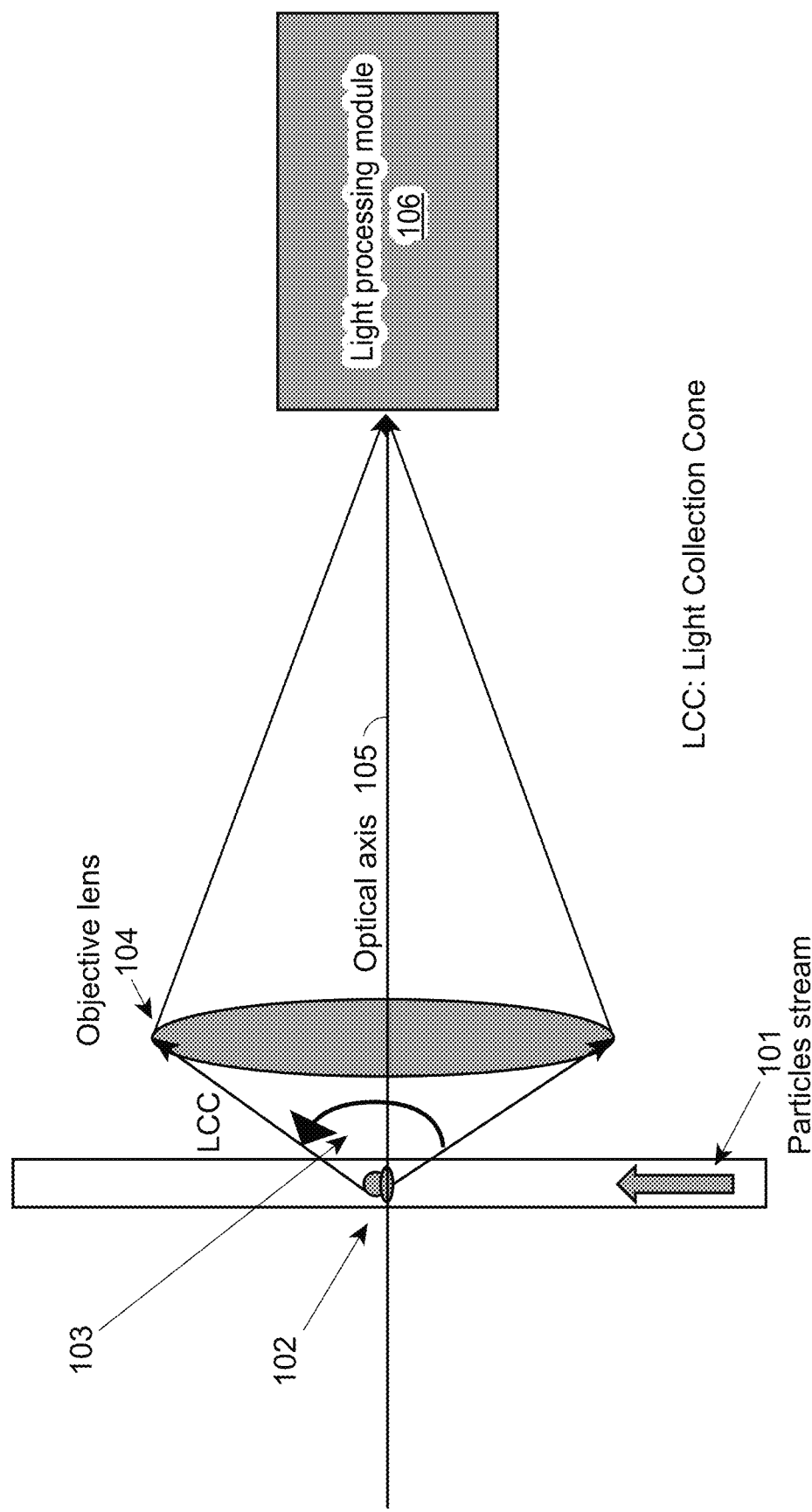
FIG. 1 depicts a schematic illustration of a conventional light collection system.
Figure 2:
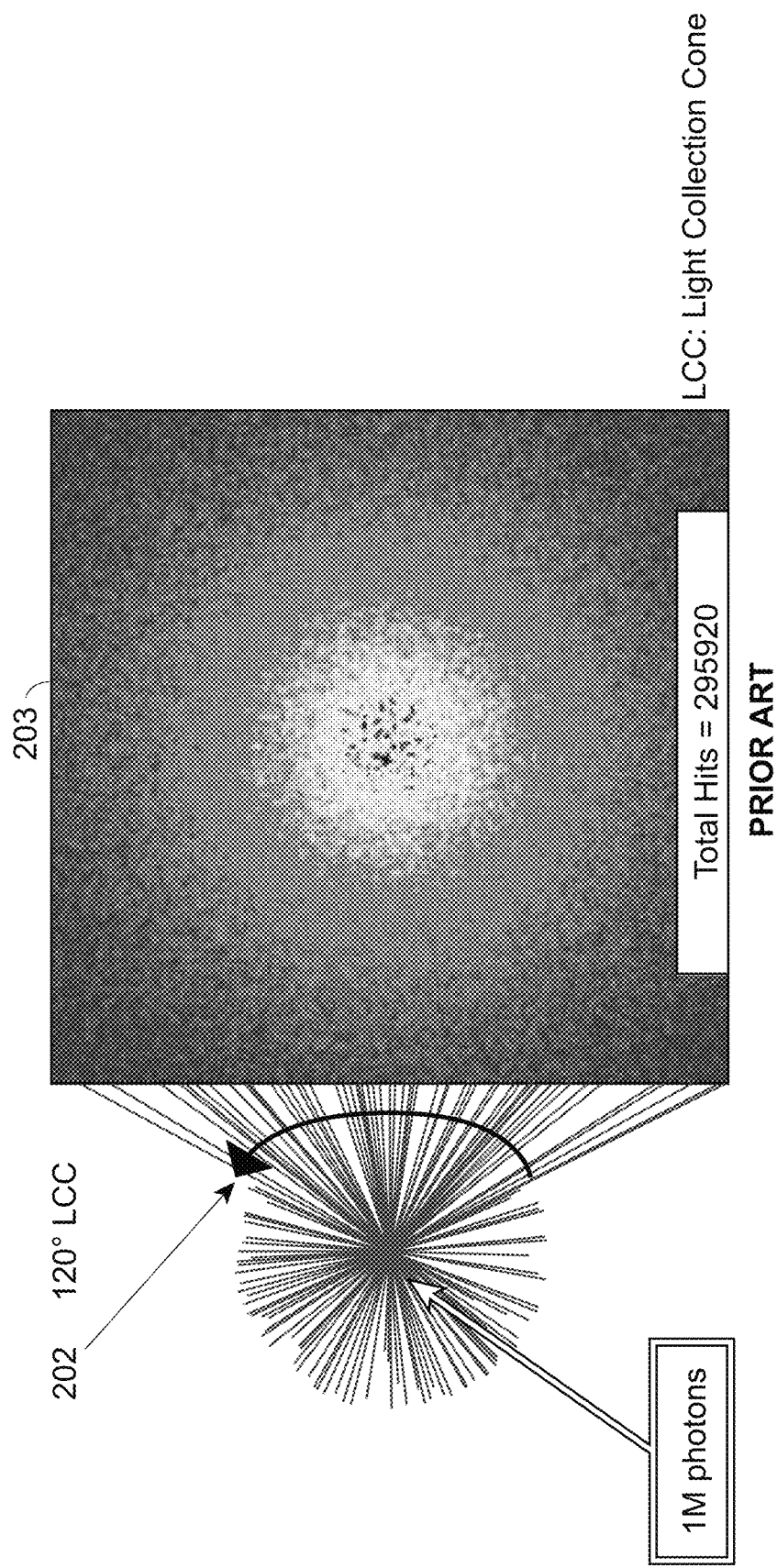
FIG. 2 depicts light collected by a conventional light collection system.

Flow cytometers including light collection enhancers are provided. In embodiments, the subject flow cytometers include a flow cell, a light source, an objective lens for focusing particle-modulated light propagating within a first light collection cone and a light collection enhancer configured to collect particle-modulated light propagating along an optical path within a second light collection cone and redirect the collected light such that it is back-propagated along the same optical path and focused by the objective lens for detection. Light collection enhancers of interest include a reflective optical element (e.g., a mirror) and a condenser lens positioned between the reflective optical element and the flow cell. Methods for analyzing a sample are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Flow Cytometers Including Light Collection Enhancers

As discussed above, aspects of the invention involve flow cytometers having a flow cell for transporting particles in a flow stream, a light source for irradiating the particles in the flow stream at an interrogation point, an objective lens for focusing particle-modulated light propagating within a first light collection cone, and a light collection enhancer for collecting particle-modulated light propagating within a second light collection cone. In some instances, the subject light collection enhancer is configured to increase the total amount of particle-modulated light focused by the objective lens. In such instances, the light collection enhancer may direct to the objective lens a portion of particle-modulated light that would otherwise not have been collected. As such, the light collection enhancers described herein may increase the sensitivity of flow cytometers such that the signal to noise ratio is increased.

By "particle-modulated light", it is meant light that is emitted by the particles in the flow stream following the irradiation of the particles with light from the light source. In some cases, the particle-modulated light is fluorescent light. Fluorescent light may, for example, be emitted by a particle having a fluorochrome after said fluorochrome is irradiated with excitation wavelength light. In other cases, the particle-modulated light is side-scattered light. As discussed herein, side-scattered light refers to light refracted and reflected from the surfaces and internal structures of the particle. In still other cases, the particle-modulated light includes both fluorescent light and side-scattered light. As discussed above, by "light collection cone" it is meant a conical region located adjacent to the flow cell in which particle-modulated light is focused by an objective lens for detection. In some embodiments, particle-modulated light propagating outside of a light collection cone is not focused by the objective lens for detection. Accordingly, in some instances, the first collection cone includes particle-modulated light propagating away from the flow cell in a first direction that is subsequently focused by the objective lens and detected. The "interrogation point" discussed herein refers to a region within the flow cell in which the particle is irradiated by light from the light source for analysis. The size of the interrogation point may vary as desired. For example, where 0 µm represents the optical axis of light emitted by the light source, the interrogation point may range from −50 µm to 50 µm, such as −25 µm to 40 µm, and including −15 µm to 30 µm.

As discussed above, the subject flow cytometers are configured to collect particle-modulated light propagating within first and second light collection cones. The first light collection cone may be any convenient size. The size of a light collection cone may be described herein in terms of the apex angle of the cone. An "apex angle" is defined as the angle between the two generatrix lines of the cone (i.e., line segments running between the base of the cone and the apex). A light collection cone having a larger apex angle encompasses more particle-modulated light emitting from the irradiated particles passing through the flow cell than a light collection cone having a smaller apex angle. Accordingly, in some embodiments, the subject first light collection cone is defined by an apex angle ranging from less than 1 degrees to 120 degrees, such as 50 degrees to 120 degrees, and including 100 degrees to 120 degrees. In certain cases, the first light collection is defined by an apex angle of 120 degrees. In some embodiments, the size of the first collection cone may be determined by the size (e.g., diameter) of the objective lens. For example, optical systems having a large objective lens may increase the amount of particle-modulated light collected by creating a first light collection cone having a wider apex angle. The size of the first collection cone may also be determined by the distance separating the flow cell and the objective lens. For example, optical systems having a short distance separating the flow cell and the objective may increase the amount of particle-modulated light collected by creating a first light collection cone having a wider apex angle.

Objective lenses of interest for focusing particle-modulated light propagating within a first light collection cone may include one or a combination of a collimating lens, a focusing lens, a magnifying lens, a de-magnifying lens, or other lens, that are configured to receive light from a detection zone of a flow cell and produce imaged light that is transmitted to one or more detectors in the flow cytometer.

As discussed above, the subject light collection enhancer collects particle-modulated light propagating within a second light collection cone and redirects the collected light such that it is also focused by the objective lens (i.e., in addition to the particle-modulated light propagating within the first light collection cone). Accordingly, the second light collection cone includes particle-modulated light propagating away from the flow cell in a second direction that is distinct from the first direction in which particle-modulated light within the first light collection cone propagates. The subject second light collection cone may be defined by any convenient apex angle. in some embodiments, the second light collection cone is defined by an apex angle ranging from less than 1 degrees to 120 degrees, such as 50 degrees to 120 degrees, and including 100 degrees to 120 degrees. In certain embodiments, the second light collection cone is defined by an apex angle ranging from 20 degrees to 100 degrees. In still further instances, the second light collection cone is defined by an apex angle of 45 degrees. In some cases, the second light collection cone is the same size as the first light collection cone. In other cases, the second light collection cone is smaller than the first light collection cone.

In some instances, the light collection enhancer increases the total amount of particle-modulated light collected from the flow cell. In these instances, the light collection enhancer may be configured to collect particle-modulated light within a second light collection cone that would otherwise remain uncollected and undetected by the flow cytometer. For example, in some embodiments, the subject light collection enhancers may redirect particle-modulated light propagating within the second light collection cone such that the total amount of particle-modulated light collected from the flow cell increases by 1% to 100%, such as 20% to 99%, and including 30% to 50%. In some cases, the increase of the total amount of particle-modulated light is proportional to the size of the second light collection cone relative to the first light collection cone. For example, where the second collection cone and the first collection cone are the same size, the subject light collection enhancer may increase the total amount of collected light by 100%, effectively doubling the total amount of particle-modulated light collected. Light collection enhancers of interest may therefore increase the amount of signal detected and thereby improve the signal to noise ratio. By "noise" it is meant irrelevant and compromised signals in flow cytometry data resulting from operational change in the laser (i.e., changes in laser light intensity). In certain cases, therefore, the subject light collection enhancers may increase the quality of flow cytometer data by increasing the amount of particle-modulated light signal detected relative to noise.

In some embodiments, the light collection enhancer and corresponding second light collection cone are located on the opposite side of the flow cell with respect to the objective lens and first collection cone. In such embodiments, the light collection enhancer redirects the particle-modulated light propagating within the second light collection cone such that the light is back-propagated to the flow cell. The back-propagated light subsequently passes through the interrogation point of flow cell and is thereby directed to the objective lens so that it can be focused and detected. In other words, particle-modulated light within the second light collection cone that has been redirected by the light collection enhancer through the interrogation point of the flow cell is focused by the objective lens along with the particle-modulated light propagating within the first light collection cone.

Aspects of the light collection enhancer include a reflective optical element for redirecting the collected light such that it is focused by the objective lens. Any convenient optical element for reflecting light may be used as the reflective optical element described herein. In certain instances, the reflective optical element includes a mirror. In other embodiments, the reflective optical element includes a series of mirrors. In certain instances, the reflective optical element is comprised of one or more flat mirrors. The flat mirror described herein possesses a planar reflective surface where the angle of reflection is equal to the angle of irradiance (i.e., the mirror possesses a focal length of infinity). In additional embodiments, the reflective optical element is configured to invert the wavefront of redirected particle-modulated light propagating within the second light collection cone. In some cases, the inverted wavefront of back-propagating particle-modulated light prevents optical interference with light propagating away from the flow cell in the second light collection cone and/or the first light collection cone. The reflective optical element may be positioned at any convenient distance relative to the flow cell. For example, in some embodiments, the reflective optical element is separated from the flow cell by a distance ranging from greater than 0 mm to 100 mm (e.g., 0.1 to 100 mm), such as 20 mm to 80 mm, and including 30 mm to 60 mm. In some cases, the subject reflective optical element is achromatic. In these cases, the reflective optical element does not separate particle-modulated light into beams of different wavelengths/colors.

Aspects of the light collection enhancer also include a condenser lens positioned between the reflective optical element and the flow cell. The condenser lens discussed herein refers to a lens that renders divergent beams into parallel, collimated, beams. The term "collimate" is used in its conventional sense to refer to optically adjusting the collinearity of light propagation or reducing divergence by the light of from a common axis of propagation. In some instances, collimating includes narrowing the spatial cross section of a light beam. As discussed above, light emitted from a particle passing through the flow cell propagates in all directions. The subject condenser lens, therefore, collects such divergent rays of light propagating within the second light collection cone and collimates the rays such that they travel parallel relative to one another. In addition to collimating the beams, the subject condenser lens may be configured to direct particle-modulated light propagating within the second light collection cone to the reflective optical element. In certain cases, the reflective optical element is positioned to reflect the particle-modulated light such that the light is back-propagated to the condenser lens. Following its return to the condenser lens, in certain cases, the back-propagated particle-modulated light is focused by the condenser lens onto the interrogation point of the flow cell such that the light is focused by the objective lens (e.g., as discussed above). In some cases, the subject condenser lens is achromatic. In these cases, the condenser lens does not separate particle-modulated light into beams of different wavelengths/colors.

In cases where the light collection enhancer is positioned on the opposite side of the flow cell relative to the objective lens, the condenser lens may be positioned along the same optical axis as the objective lens. In such instances, an imaginary straight line passes through the center of the collimator lens, the interrogation point of the flow cell, and the center of the objective lens. In some embodiments, the size of the second collection cone may be determined by the size (e.g., diameter) of the condenser lens. For example, optical systems having a large condenser lens may increase the amount of particle-modulated light collected by creating a second light collection cone having a wider apex angle. The size of the second collection cone may also be determined by the distance separating the flow cell and the objective lens. For example, optical systems having a short distance separating the flow cell and the objective may increase the amount of particle-modulated light collected by creating a first light collection cone having a wider apex angle. In embodiments, the subject condenser lens is separated from the flow cell by a distance ranging from greater than 0 mm to 50 mm (e.g., 0.1 mm to 50 mm), such as 5 mm to 30 mm, and including 10 mm to 20 mm. Additionally, the reflective optical element may be separated from the condenser lens by a distance ranging from greater than 0 mm to 20 mm (e.g., 0.1 mm to 20 mm), such as 3 mm to 15 mm, and including 5 mm to 10 mm.

In additional aspects of the invention, the light collection enhancer collects particle-modulated-light propagating along an optical path within the second light collection cone and redirects the collected light such that it is back propagated along the same optical path before it passes through the interrogation point of the flow cell and is focused by the objective lens. Put another way, different rays of light propagating within the second light collection cone follow particular optical paths as they travel through the light collection enhancer. In embodiments, the light collection enhancer redirects the particle-modulated light such that it travels along the same optical path it had traveled before being redirected by the light collection enhancer. In these embodiments, the light collection enhancer may be configured such that the condenser lens projects collimated beams of particle-modulated light onto a reflective optical element that includes a flat mirror. It may be desirable in such instances for the condenser lens to collimate the beams of particle-modulated light such that they propagate along an optical path that is normal relative to the flat mirror. Because the flat mirror possesses a planar reflective surface where the angle of reflection is equal to the angle of irradiance, particle-modulated light is back-reflected to the condenser along the same optical path as it is refocused by the condenser lens and directed to the interrogation point of the flow cell. In some aspects of the invention, the subject light collection enhancer is detachable from the flow cytometer. In such instances, the flow cytometer and light collection enhancer may be modular such that the light collection enhancer can be removed from and reattached to the flow cytometer as desired. In embodiments, the light collection enhancer is surrounded by a housing inside which the reflective optical element and the condenser lens are affixed. In some embodiments, the location of the reflective optical element and condenser lens within a modular housing reduces the need for manual optical alignment of these components with the objective lens and flow cell.

Figure 3:
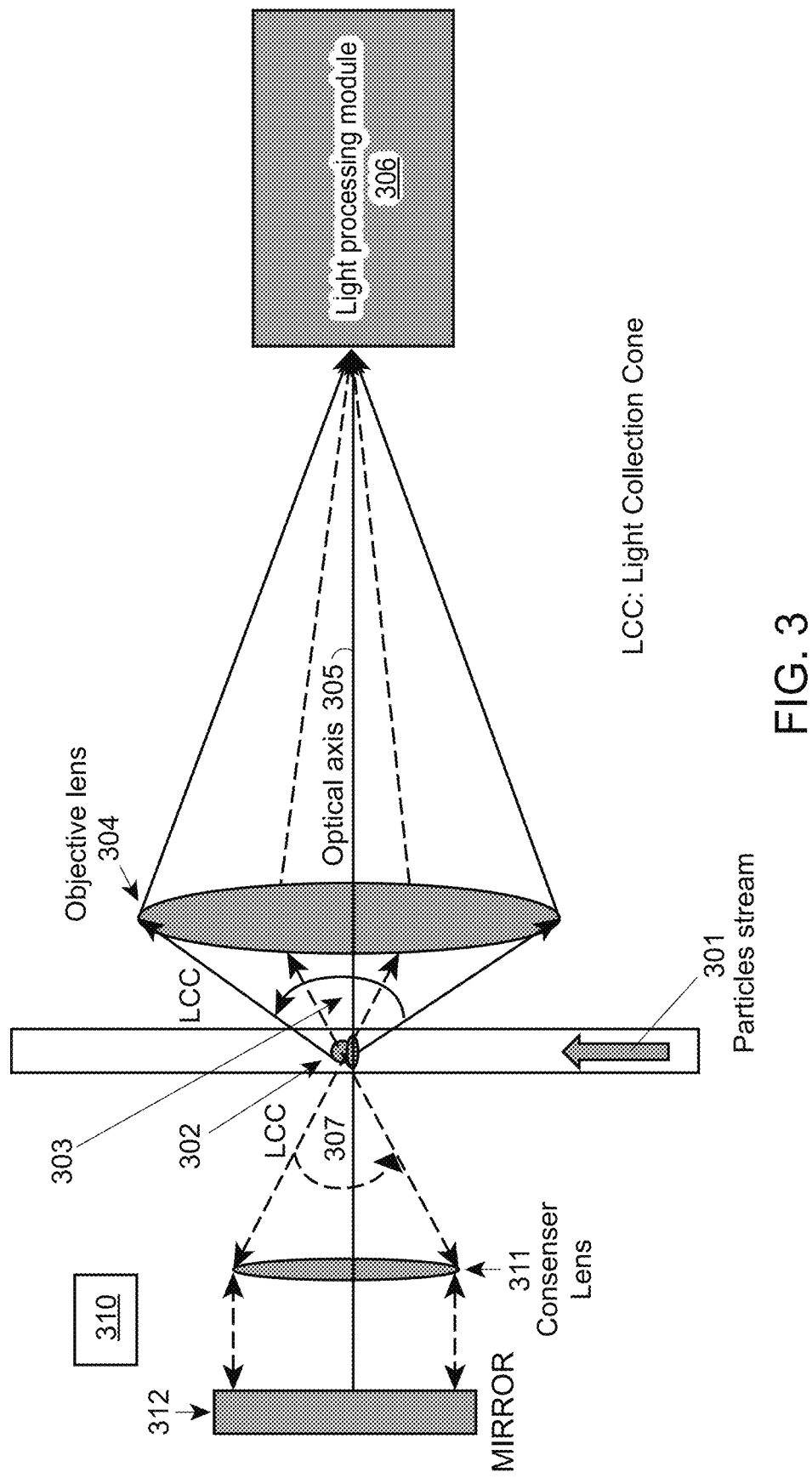
FIG. 3 depicts a schematic illustration of a flow cytometer having a light collection enhancer according to certain embodiments.

FIG. 3 depicts a flow cytometric system having a light collection enhancer according to certain embodiments. Particles passing through flow stream 301 are irradiated by a light source (not shown) at an interrogation point 302. Following the irradiation, particle-modulated light is emitted in all directions. Particle-modulated light propagating within first light collection cone 303 is collected by objective lens 304 and focused onto light processing module 306 for detection. Particle-modulated light within second light collection cone 307 is collected and redirected by light collection enhancer 310. Condenser lens 311 collects and collimates particle-modulated light from second light collection cone 307. The collected and collimated light is subsequently directed to a reflective optical element, depicted in FIG. 3 as mirror 312. Particle-modulated light is reflected by mirror 312 and back-propagated to condenser lens 311 along the same optical path it had followed prior to reaching mirror 312. Condenser lens 311 focuses the back-propagated light onto interrogation point 302 within the flow cell. The back-propagated light is subsequently collected by objective lens 304 along with the light propagating within the first light collection cone and focused onto light processing module 306 for detection.

Figure 4:
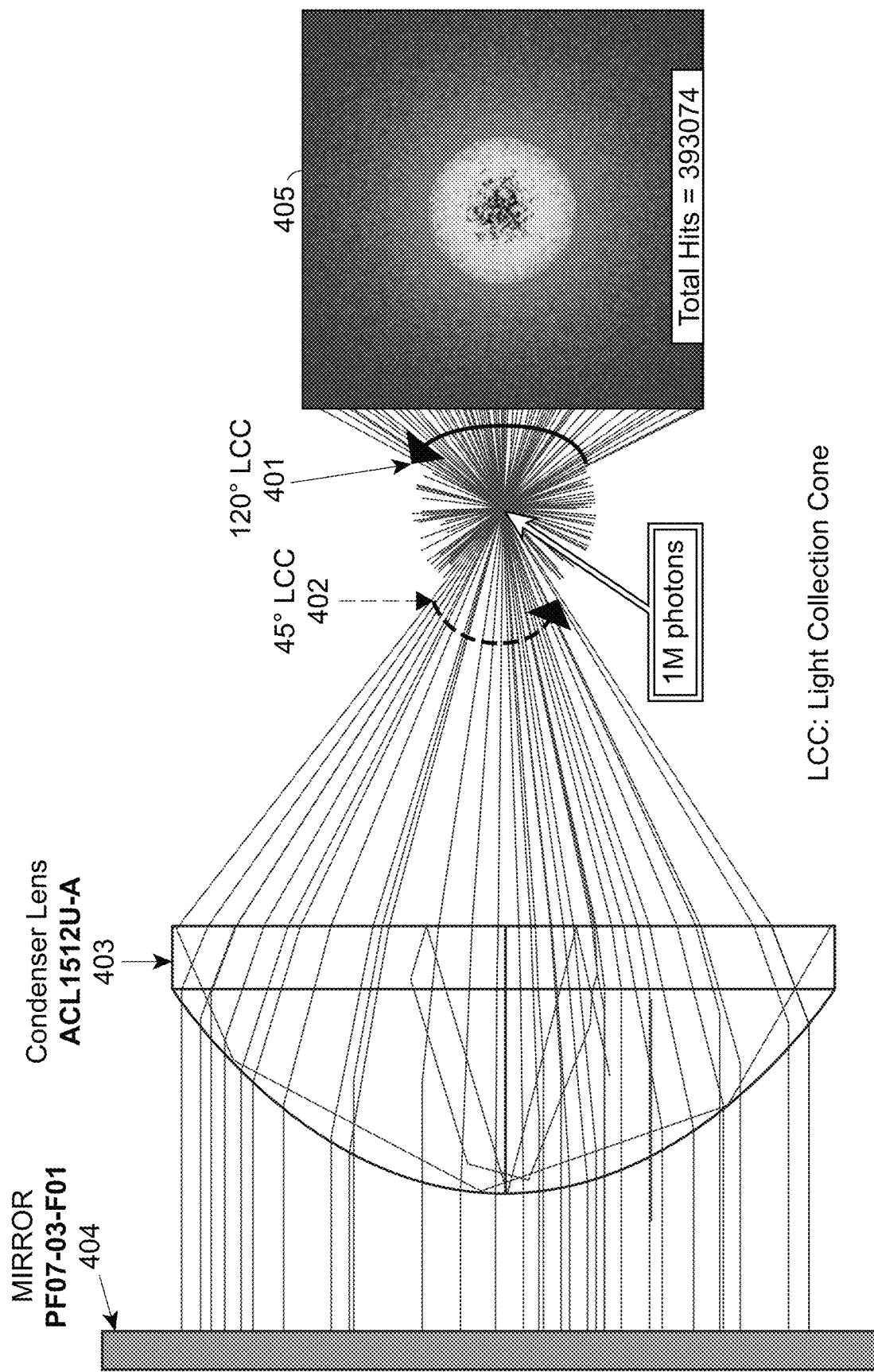
FIG. 4 depicts light collected by a flow cytometer having a light collection enhancer according to certain embodiments.

FIG. 4 depicts the collection of light via flow cytometric system having a light collection enhancer according to certain embodiments. Particle-modulated light is emitted in all directions. First light collection cone 401 is defined by an apex angle of 120 degrees. Second light collection cone 402 is defined by an apex angle of 45 degrees. Light within second light collection cone 402 is collected and collimated by condenser lens 403. The collected and condensed light is subsequently directed to the reflective optical element, depicted in FIG. 4 as mirror 404. Particle-modulated light is redirected by the reflective optical element such that it is back-propagated to the condenser lens 403 and focused onto the interrogation point. Back-propagated particle-modulated light is subsequently collected and detected along with the particle-modulated light propagating within first light collection cone 401. Particle-modulated light from both the first and second light collection cones are detected, as shown in beam profile 405.

As discussed above, aspects of the subject flow cytometers include a flow cell configured to propagate particles in a flow stream. Any convenient flow cell which propagates a fluidic sample to a sample interrogation region may be employed, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that is transverse to the longitudinal axis.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell includes a sample injection port configured to provide a sample to the flow cell. The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, such as 0.2 to 3.0 mm, such as 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-sectional shape of the sample injection tube. For example, the orifice of the sample injection port may include a beveled tip having a bevel angle ranging from 1 degree to 10 degrees, such as from 2 degrees to 9 degrees, such as from 3 degrees to 8 degrees, such as from 4 degrees to 7 degrees and including a bevel angle of 5 degrees.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 µL/sec to 2500 µL/sec, such as 50 µL/sec to 1000 µL/sec, and including 75 µL/sec or more to 750 µL/sec.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for multi-photon counting of light from the sample in the flow stream. For example, the system may include a pump that is configured to flow sample through the flow cell at a rate that ranges from 1 nL/min to 500 nL/min, such as from 1 nL/min to 250 nL/min, such as from 1 nL/min to 100 nL/min, such as from 2 nL/min to 90 nL/min, such as from 3 nL/min to 80 nL/min, such as from 4 nL/min to 70 nL/min, such as from 5 nL/min to 60 nL/min and including from 10 nL/min to 50 nL/min. In certain embodiments, the flow rate of the flow stream is from 5 nL/min to 6 nL/min.

As discussed above, aspects of the invention include a light source configured to irradiate particles passing through the flow cell at an interrogation point. Any convenient light source may be employed as the light source described herein. In some embodiments, the light source is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chloride (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In some embodiments, flow cytometers having light collection enhancers include low-power lasers (e.g., 16 mW 488 nm Direct Diode Laser from Kyocera (https://www.k-soc.co.jp/en/seihin/lasers/ddfs488.html). As discussed above, the subject light collection enhancers may increase the amount of total particle-modulated light collected. Because the amount of signal received by the flow cytometric system increases, and the level of optical noise remains constant, the sensitivity of the system increases overall. In some instances, increases in light collection efficiency resulting from the light collection enhancer permits the use of low-power lasers. In some embodiments, flow cytometers having light collection enhancers and low-power lasers are less expensive and consume less energy. In additional embodiments, flow cytometers having light collection enhancers and low-power lasers may be more compact due to the smaller weight and size of the low-power lasers.

Laser light sources according to certain embodiments may also include one or more optical adjustment components. In certain embodiments, the optical adjustment component is located between the light source and the flow cell, and may include any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics.

Where the optical adjustment component is configured to move, the optical adjustment component may be configured to be moved continuously or in discrete intervals, such as for example in 0.01 µm or greater increments, such as 0.05 µm or greater, such as 0.1 µm or greater, such as 0.5 µm or greater such as 1 µm or greater, such as 10 µm or greater, such as 100 µm or greater, such as 500 µm or greater, such as 1 mm or greater, such as 5 mm or greater, such as 10 mm or greater and including 25 mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The light source may be positioned any suitable distance from the flow cell, such as where the light source and the flow cell are separated by 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle to the flow cell, such as at an angle ranging from 10 degrees to 90 degrees, such as from 15 degrees to 85 degrees, such as from 20 degrees to 80 degrees, such as from 25 degrees to 75 degrees and including from 30 degrees to 60 degrees, for example at a 90 degree angle.

In some embodiments, light sources of interest include 1 or more lasers configured to provide laser light for discrete irradiation of the flow stream, such as 2 lasers or more, such as 3 lasers or more, such as 4 lasers or more, such as 5 lasers or more, such as 10 lasers or more, and including 15 lasers or more configured to provide laser light for discrete irradiation of the flow stream. Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser.

Where more than one laser is employed, the sample may be irradiated with the lasers simultaneously or sequentially, or a combination thereof. For example, the sample may be simultaneously irradiated with each of the lasers. In other embodiments, the flow stream is sequentially irradiated with each of the lasers. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) laser, the delay between irradiation by each laser may be the same or different.

The sample may be irradiated continuously or in discrete intervals. In some instances, the light source is configured to irradiate the sample in the flow cell continuously. In other embodiments, the light source is configured to provide laser light for irradiating the flow stream in discrete intervals. The term "discrete interval" is used herein in its conventional sense to refer to laser irradiation of the flow stream for a predetermined duration of time followed by a period of time where the flow stream is not irradiated by the laser (e.g., by turning off the laser or by blocking light laser conveyed from the light propagation component such as with a chopper, beam stop, etc.). In some embodiments, laser light from is conveyed to the flow stream in discrete intervals of 0.001 us or more, such as for 0.005 us or more, such as for 0.01 us or more, such as for 0.05 us or more, such as for 0.1 us or more, such as for 0.5 us or more, such as for 1 μs or more, such as for 5 μs or more, such as for 10 μs or more, such as for 50 μs or more, such as for 100 μs or more and including for 500 μs or more. In certain instances, laser light is conveyed to the flow stream in discrete intervals of from 0.0001 μs to 500 ms, such as from 0.0005 μs to 250 ms, such as from 0.001 μs to 50 ms, such as from 0.005 μs to 5 ms, such as from 0.01 μs to 1000 μs, such as from 0.05 to 750 μs, such as from 0.1 μs to 500 μs, such as from 0.5 μs to 250 μs, such as from 1 μs to 100 μs and including from 10 μs to 100 μs. The duration between each discrete interval may be 0.001 μs or more, such as 0.005 μs or more, such as 0.01 μs or more, such as 0.05 μs or more, such as 0.1 μs or more, such as 0.5 μs or more, such as 1 μs or more, such as 5 μs or more, such as 10 μs or more, such as 50 μs or more, such as 100 μs or more and including 500 μs or more. For example, the duration between each discrete interval may range from 0.0001 μs to 500 ms, such as from 0.0005 μs to 250 ms, such as from 0.001 μs to 50 ms, such as from 0.005 μs to 5 ms, such as from 0.01 μs to 1000 μs, such as from 0.05 to 750 μs, such as from 0.1 μs to 500 μs, such as from 0.5 μs to 250 μs, such as from 1 μs to 100 μs and including from 10 μs to 100 μs.

Aspects of the subject flow cytometers also include one or more light detectors for detecting particle-modulated light. As discussed above, the objective lens is configured to focus particle-modulated light onto the one or light detectors for detection. Any convenient detector for detecting collected light may be employed. For example, where the particle-modulated light includes side-scattered light, aspects of the invention may include a side scatter detector configured to detect side scatter wavelengths of light (e.g., light refracted and reflected from the surfaces and internal structures of the particle). In other embodiments, flow cytometers include multiple side scatter detectors, such as 2 or more, such as 3 or more, such as 4 or more, and including 5 or more.

Any convenient detector for detecting collected light may be used in the side scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject flow cytometers include multiple side scatter detectors, each side scatter detector may be the same, or the collection of side scatter detectors may be a combination of different types of detectors. For example, where the subject flow cytometers include two side scatter detectors, in some embodiments the first side scatter detector is a CCD-type device and the second side scatter detector (or imaging sensor) is a CMOS-type device. In other embodiments, both the first and second side scatter detectors are CCD-type devices. In yet other embodiments, both the first and second side scatter detectors are CMOS-type devices. In still other embodiments, the first side scatter detector is a CCD-type device and the second side scatter detector is a photomultiplier tube (PMT). In still other embodiments, the first side scatter detector is a CMOS-type device and the second side scatter detector is a photomultiplier tube. In yet other embodiments, both the first and second side scatter detectors are photomultiplier tubes.

Embodiments of the invention also include a light dispersion/separator module positioned between the flow cell and the side scatter detector. Light dispersion devices of interest include but are not limited to, colored glass, bandpass filters, interference filters, dichroic mirrors, diffraction gratings, monochromators and combinations thereof, among other wavelength separating devices.

In embodiments, the subject flow cytometers also include a fluorescent light detector configured to detect one or more fluorescent wavelengths of light. In other embodiments, flow cytometers include multiple fluorescent light detectors such as 2 or more, such as 3 or more, such as 4 or more, 5 or more, 10 or more, 15 or more, and including 20 or more.

Any convenient detector for detecting collected light may be used in the fluorescent light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to 5 cm$^2$.

Where the subject flow cytometers include multiple fluorescent light detectors, each fluorescent light detector may be the same, or the collection of fluorescent light detectors may be a combination of different types of detectors. For example, where the subject flow cytometers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

Embodiments of the invention also include a light dispersion/separator module positioned between the flow cell and the fluorescent light detector. Light dispersion devices of interest include but are not limited to, colored glass, bandpass filters, interference filters, dichroic mirrors, diffraction gratings, monochromators and combinations thereof, among other wavelength separating devices.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in a flow cytometer as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, flow cytometers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, flow cytometers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

Aspects of the invention also include a forward scatter detector configured to detect forward scattered light. The number of forward scatter detectors in the subject flow cytometers may vary, as desired. For example, the subject particle analyzers may include 1 forward scatter detector or multiple forward scatter detectors, such as 2 or more, such as 3 or more, such as 4 or more, and including 5 or more. In certain embodiments, flow cytometers include 1 forward scatter detector. In other embodiments, flow cytometers include 2 forward scatter detectors.

Any convenient detector for detecting collected light may be used in the forward scatter detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Where the subject particle analyzers include multiple forward scatter detectors, each detector may be the same, or the collection of detectors may be a combination of different types of detectors. For example, where the subject particle analyzers include two forward scatter detectors, in some embodiments the first forward scatter detector is a CCD-type device and the second forward scatter detector (or imaging sensor) is a CMOS-type device. In other embodiments, both the first and second forward scatter detectors are CCD-type devices. In yet other embodiments, both the first and second forward scatter detectors are CMOS-type devices. In still other embodiments, the first forward scatter detector is a CCD-type device and the second forward scatter detector is a photomultiplier tube (PMT). In still other embodiments, the first forward scatter detector is a CMOS-type device and the second forward scatter detector is a photomultiplier tube. In yet other embodiments, both the first and second forward scatter detectors are photomultiplier tubes.

Embodiments of the invention also include a light dispersion/separator module positioned between the flow cell and the forward scatter detector. Light dispersion devices of interest include but are not limited to, colored glass, bandpass filters, interference filters, dichroic mirrors, diffraction gratings, monochromators and combinations thereof, among other wavelength separating devices. In some embodiments, a bandpass filter is positioned between the flow cell and the forward scatter detector. In other embodiments, more than one bandpass filter is positioned between the flow cell and the forward scatter detector, such as, for example, 2 or more, 3 or more, 4 or more, and including 5 or more. In embodiments, the bandpass filters have a minimum bandwidth ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm. wavelengths and reflects light with other wavelengths to the forward scatter detector.

In embodiments, the subject light detectors are configured to measure light continuously or in discrete intervals. In some instances, light detectors are configured to take measurements of the collected light continuously. In other instances, light collection elements of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Embodiments of the invention further include an optical adjustment component positioned between the objective lens and the one or more light detectors. By "optical adjustment" is meant that a parameter of particle-modulated light may be changed as desired, such as to increase or decrease the width of the beam, beam irradiation direction, wavelength, beam profile, beam width, beam intensity, focal point, pulse width or some other parameter. In some instances, optical adjustment is a magnification protocol configured to increase the spatial dimensions of the beamspot, such as by 1% or greater, such as by 5% or greater, such as by 10% or greater, such as by 25% or greater, such as by 50% or greater and including increasing the spatial dimensions of the beamspot by 75% or greater. In other instances, optical adjustment is a de-magnification protocol configured to decrease the spatial dimensions of the laser beamspot, such as by 1% or greater, such as by 5% or greater, such as by 10% or greater, such as by 25% or greater, such as by 50% or greater and including decreasing the spatial dimensions of the laser beamspot by 75% or greater. In other instances, the optical adjustment includes collimating the at least first and second beams before irradiation of the light collection element via a beam collimator.

Suitable flow cytometry systems may include, but are not limited to those described in Ormerod (ed.), *Flow Cytometry: A Practical Approach, Oxford* Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49(pt 1):17-28; Linden, et. al., *Semin Throm Hemost.* 2004 October; 30(5): 502-11; Alison, et al. *J Pathol,* 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,585,031; 10,578,542; 10,578,469; 10,481,074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/

0350803; 2018/0275042; 2019/0376895 and 2019/0376894 the disclosures of which are herein incorporated by reference.

Figure 5:
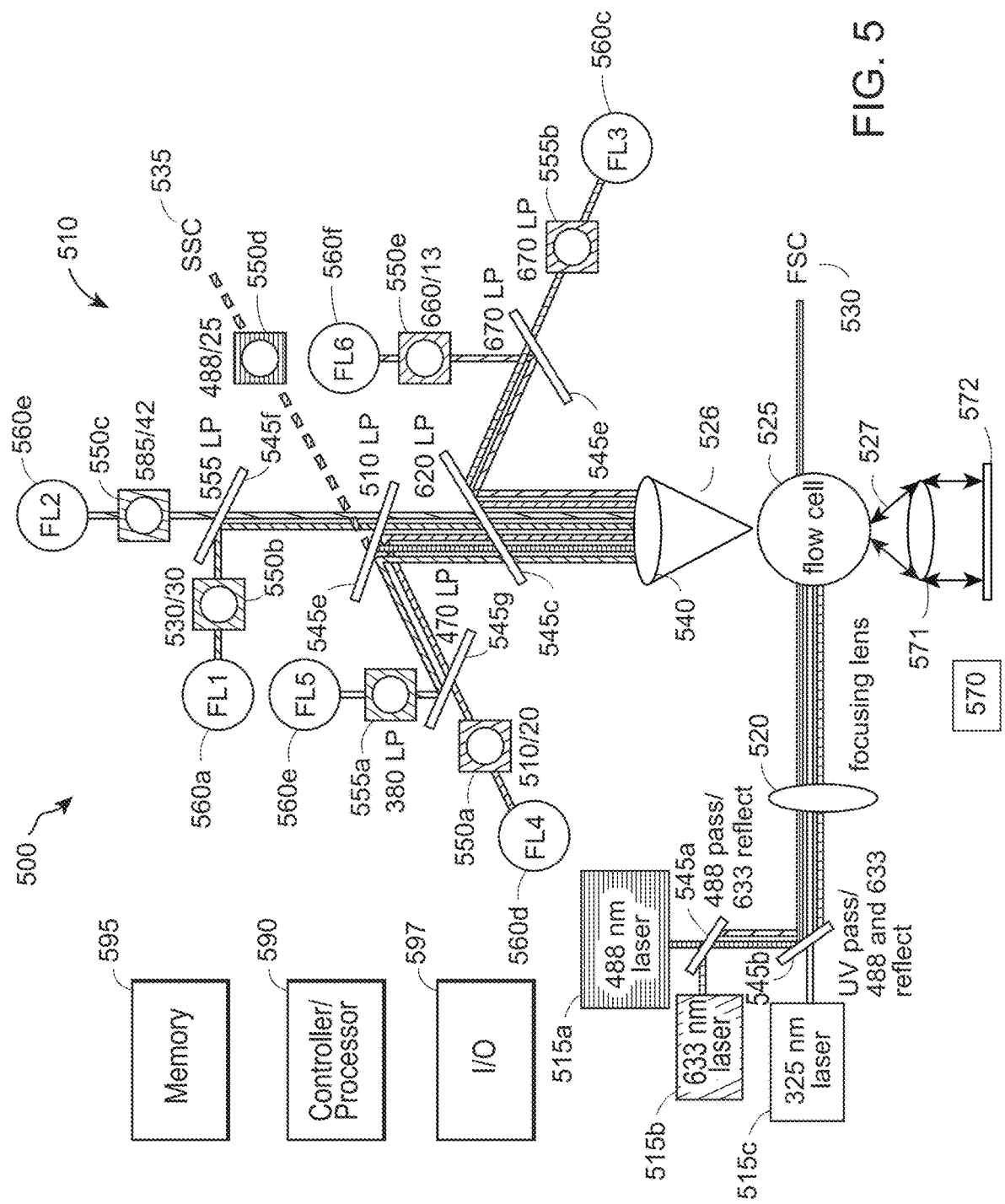
FIG. 5 depicts a flow cytometer having a light collection element according to certain embodiments.

FIG. 5 shows a system 500 for flow cytometry in accordance with an illustrative embodiment of the present invention. The system 500 includes a flow cytometer 510, a controller/processor 590 and a memory 595. The flow cytometer 510 includes one or more excitation lasers 515a-515c, a focusing lens 520, a flow cell 525, a light collection enhancer 570, a forward scatter detector 530, a side scatter detector 535, an objective lens 540, one or more beam splitters 545a-545g, one or more bandpass filters 550a-550e, one or more longpass ("LP") filters 555a-555b, and one or more fluorescent light detectors 560a-560f.

The excitation lasers 515a-c emit light in the form of a laser beam. The wavelengths of the laser beams emitted from excitation lasers 515a-515c are 488 nm, 633 nm, and 325 nm, respectively, in the example system of FIG. 5. The laser beams are first directed through one or more of beam splitters 545a and 545b. Beam splitter 545a transmits light at 488 nm and reflects light at 633 nm. Beam splitter 545b transmits UV light (light with a wavelength in the range of 10 to 400 nm) and reflects light at 488 nm and 633 nm.

The laser beams are then directed to a focusing lens 520, which focuses the beams onto the portion of a fluid stream where particles of a sample are located, within the flow cell 525. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. Particle-modulated light is emitted in all directions. Particle-modulated light propagating within first light detection cone 526 is routed to one or more of the side scatter detector 535, and the one or more fluorescent light detectors 560a-560f through one or more of the beam splitters 545a-545g, the bandpass filters 550a-550e, the longpass filters 555a-555b, and the objective lens 540. On the other hand, particle-modulated light propagating within the second light collection cone 527 is redirected by light collection enhancer 570 such that it is back-propagated through flow cell 525 and focused by objective lens 540. Light collection enhancer 570 includes condenser lens 571 and reflective optical element 572.

The objective lens 540 collects light emitted from the particle-laser beam interaction and routes that light towards one or more beam splitters and filters. Bandpass filters, such as bandpass filters 550a-550e, allow a narrow range of wavelengths to pass through the filter. For example, bandpass filter 550a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 555a-555b, transmit wavelengths of light equal to or longer than a specified wavelength of light. For example, longpass filter 555a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 505g is a 620 SP beam splitter, meaning that the beam splitter 545g transmits wavelengths of light that are 620 nm or shorter and reflects wavelengths of light that are longer than 620 nm in a different direction. In one embodiment, the beam splitters 545a-545g can comprise optical mirrors, such as dichroic mirrors.

The forward scatter detector 530 is positioned off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 535 is configured to detect refracted and reflected light from the surfaces and internal structures of the particle, and tends to increase with increasing particle complexity of structure. The fluorescence emissions from fluorescent molecules associated with the particle can be detected by the one or more fluorescent light detectors 560a-560f. The side scatter detector 535 and fluorescent light detectors can include photomultiplier tubes. The signals detected at the forward scatter detector 530, the side scatter detector 535 and the fluorescent detectors can be converted to electronic signals (voltages) by the detectors. This data can provide information about the sample.

Flow cytometer operation is controlled by a controller/processor 590, and the measurement data from the detectors can be stored in the memory 595 and processed by the controller/processor 590. Although not shown explicitly, the controller/processor 590 is coupled to the detectors to receive the output signals therefrom, and may also be coupled to electrical and electromechanical components of the flow cytometer 500 to control the lasers, fluid flow parameters, and the like. Input/output (I/O) capabilities 597 may be provided also in the system. The memory 595, controller/processor 590, and I/O 597 may be entirely provided as an integral part of the flow cytometer 510. In such an embodiment, a display may also form part of the I/O capabilities 597 for presenting experimental data to users of the cytometer 500. Alternatively, some or all of the memory 595 and controller/processor 590 and I/O capabilities may be part of one or more external devices such as a general purpose computer. In some embodiments, some or all of the memory 595 and controller/processor 590 can be in wireless or wired communication with the cytometer 510. The controller/processor 590 in conjunction with the memory 595 and the I/O 597 can be configured to perform various functions related to the preparation and analysis of a flow cytometer experiment.

The system illustrated in FIG. 5 includes six different detectors that detect fluorescent light in six different wavelength bands (which may be referred to herein as a "filter window" for a given detector) as defined by the configuration of filters and/or splitters in the beam path from the flow cell 525 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 597 can be configured to receive data regarding a flow cytometer experiment having a panel of fluorescent labels and a plurality of cell populations having a plurality of markers, each cell population having a subset of the plurality of markers. The I/O 597 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 595. The controller/processor 590 can be configured to evaluate one or more assignments of labels to markers.

One of skill in the art will recognize that a flow cytometer in accordance with an embodiment of the present invention is not limited to the flow cytometer depicted in FIG. 5, but can include any flow cytometer known in the art. For example, a flow cytometer may have any number of lasers, beam splitters, filters, and detectors at various wavelengths and in various different configurations.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Patent Publication No. 2020/0256781, filed on Aug. 13, 2020, the disclosure of which is incorporated herein by reference. In some embodiments, systems for sorting components of a sample include a particle sorting module having deflector plates, such as described in U.S. Patent Publication No. 2017/0299493, filed on Mar. 28, 2017, the disclosure of which is incorporated herein by reference.

Figure 6:
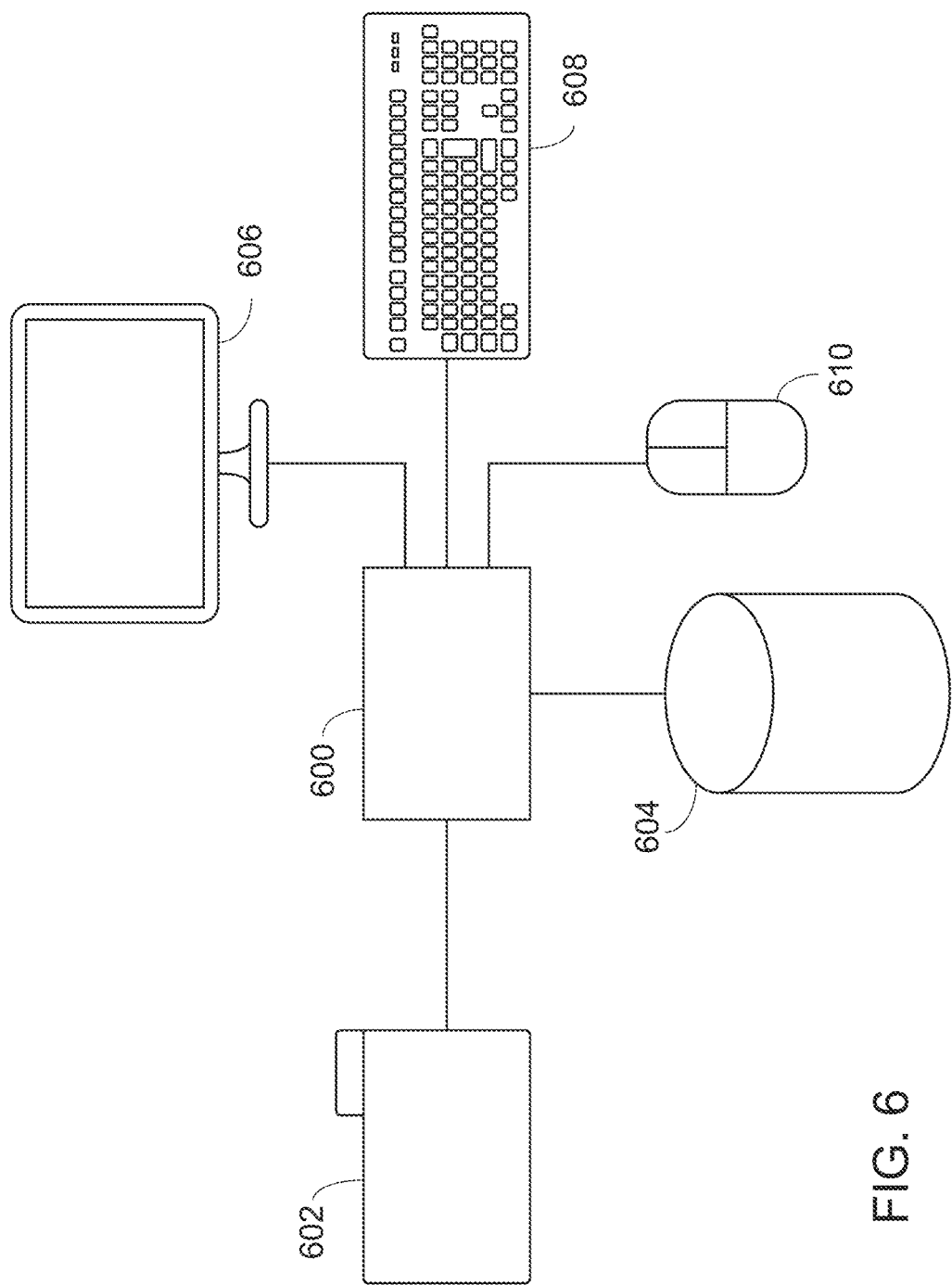
FIG. 6 depicts a functional block diagram for one example of a sorting control system according to certain embodiments.

FIG. 6 shows a functional block diagram for one example of a sorting control system, such as a processor 600, for analyzing and displaying biological events. A processor 600 can be configured to implement a variety of processes for controlling graphic display of biological events.

A flow cytometer or sorting system 602 can be configured to acquire biological event data. For example, a flow cytometer can generate flow cytometric event data. The flow cytometer 602 can be configured to provide biological event data to the processor 600. A data communication channel can be included between the flow cytometer 602 and the processor 600. The biological event data can be provided to the processor 600 via the data communication channel.

The processor 600 can be configured to receive biological event data from the flow cytometer 602. The biological event data received from the flow cytometer 602 can include flow cytometric event data. The processor 600 can be configured to provide a graphical display including a first plot of biological event data to a display device 606. The processor 600 can be further configured to render a region of interest as a gate around a population of biological event data shown by the display device 606, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The processor 600 can be further configured to display the biological event data on the display device 606 within the gate differently from other events in the biological event data outside of the gate. For example, the processor 600 can be configured to render the color of biological event data contained within the gate to be distinct from the color of biological event data outside of the gate. The display device 606 can be implemented as a monitor, a tablet computer, a smartphone, or other electronic device configured to present graphical interfaces.

The processor 600 can be configured to receive a gate selection signal identifying the gate from a first input device. For example, the first input device can be implemented as a mouse 610. The mouse 610 can initiate a gate selection signal to the processor 600 identifying the gate to be displayed on or manipulated via the display device 606 (e.g., by clicking on or in the desired gate when the cursor is positioned there). In some implementations, the first device can be implemented as the keyboard 608 or other means for providing an input signal to the processor 600 such as a touchscreen, a stylus, an optical detector, or a voice recognition system. Some input devices can include multiple inputting functions. In such implementations, the inputting functions can each be considered an input device. For example, as shown in FIG. 6, the mouse 610 can include a right mouse button and a left mouse button, each of which can generate a triggering event.

The triggering event can cause the processor 600 to alter the manner in which the data is displayed, which portions of the data is actually displayed on the display device 606, and/or provide input to further processing such as selection of a population of interest for particle sorting.

In some embodiments, the processor 600 can be configured to detect when gate selection is initiated by the mouse 610. The processor 600 can be further configured to automatically modify plot visualization to facilitate the gating process. The modification can be based on the specific distribution of biological event data received by the processor 600.

The processor 600 can be connected to a storage device 604. The storage device 604 can be configured to receive and store biological event data from the processor 600. The storage device 604 can also be configured to receive and store flow cytometric event data from the processor 600. The storage device 604 can be further configured to allow retrieval of biological event data, such as flow cytometric event data, by the processor 600.

The display device 606 can be configured to receive display data from the processor 600. The display data can comprise plots of biological event data and gates outlining sections of the plots. The display device 606 can be further configured to alter the information presented according to input received from the processor 600 in conjunction with input from the flow cytometer 602, the storage device 604, the keyboard 608, and/or the mouse 610.

In some implementations the processor 600 can generate a user interface to receive example events for sorting. For example, the user interface can include a control for receiving example events or example images. The example events or images or an example gate can be provided prior to collection of event data for a sample or based on an initial set of events for a portion of the sample.

Figure 7A:
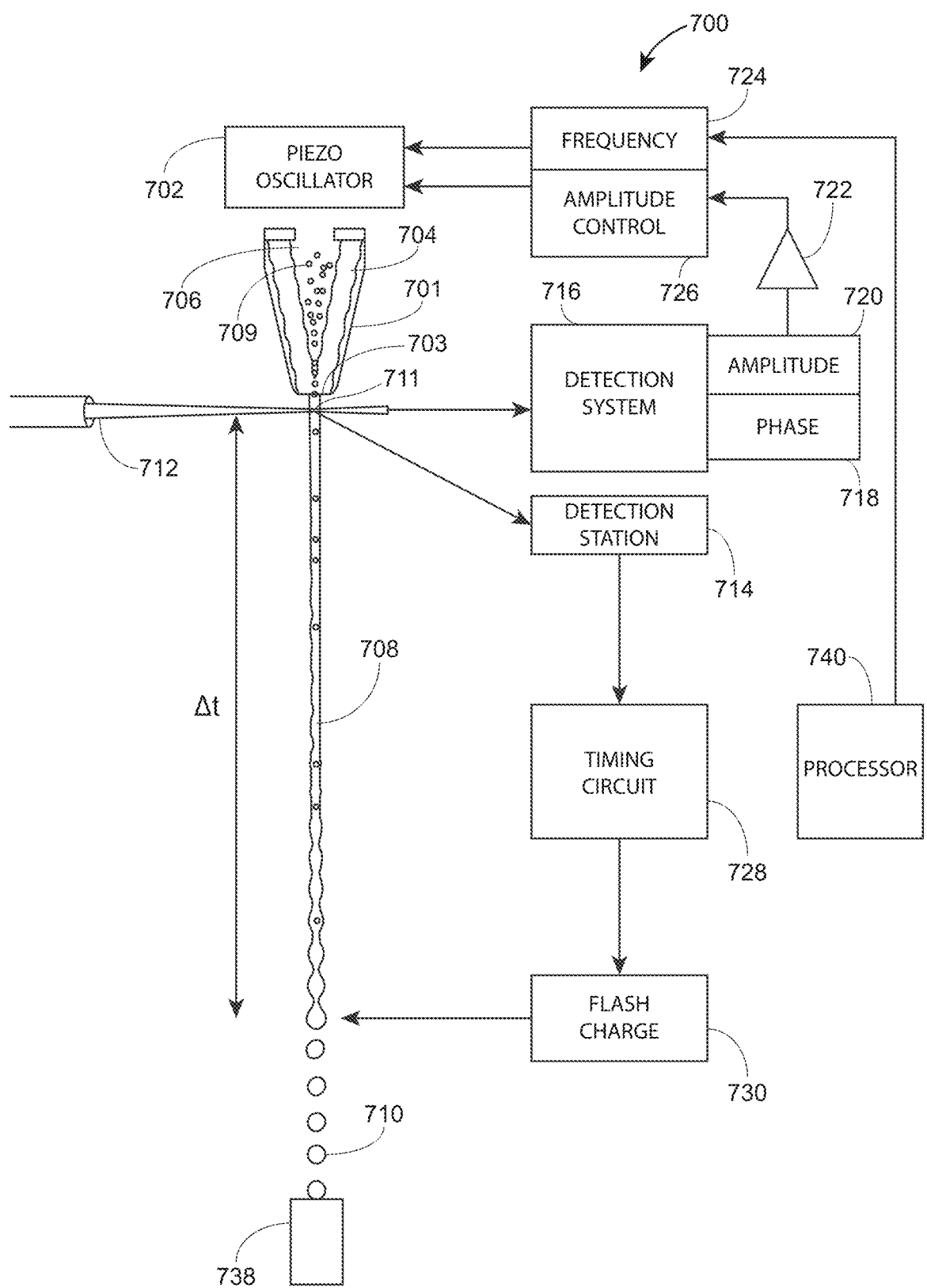
FIG. 7A depicts a schematic drawing of a particle sorter system according to certain embodiments.

FIG. 7A is a schematic drawing of a particle sorter system 700 (e.g., the flow cytometer 602) in accordance with one embodiment presented herein. In some embodiments, the particle sorter system 700 is a cell sorter system. As shown in FIG. 7A, a drop formation transducer 702 (e.g., piezo-oscillator) is coupled to a fluid conduit 701, which can be coupled to, can include, or can be, a nozzle 703. Within the fluid conduit 701, sheath fluid 704 hydrodynamically focuses a sample fluid 706 comprising particles 709 into a moving fluid column 708 (e.g. a stream). Within the moving fluid column 708, particles 709 (e.g., cells) are lined up in single file to cross a monitored area 711 (e.g., where laser-stream intersect), irradiated by an irradiation source 712 (e.g., a laser). Vibration of the drop formation transducer 702 causes moving fluid column 708 to break into a plurality of drops 710, some of which contain particles 709.

In operation, a detection station 714 (e.g., an event detector) identifies when a particle of interest (or cell of interest) crosses the monitored area 711. Detection station 714 feeds into a timing circuit 728, which in turn feeds into a flash charge circuit 730. At a drop break off point, informed by a timed drop delay (Δt), a flash charge can be applied to the moving fluid column 708 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 7A, the drops can be collected in a drain receptacle 738.

A detection system 716 (e.g. a drop boundary detector) serves to automatically determine the phase of a drop drive signal when a particle of interest passes the monitored area 711. An exemplary drop boundary detector is described in U.S. Pat. No. 7,679,039, which is incorporated herein by reference in its entirety. The detection system 716 allows the instrument to accurately calculate the place of each detected particle in a drop. The detection system 716 can feed into an amplitude signal 720 and/or phase 718 signal, which in turn feeds (via amplifier 722) into an amplitude control circuit 726 and/or frequency control circuit 724. The amplitude control circuit 726 and/or frequency control circuit 724, in turn, controls the drop formation transducer 702. The amplitude control circuit 726 and/or frequency control circuit 724 can be included in a control system.

In some implementations, sort electronics (e.g., the detection system 716, the detection station 714 and a processor 740) can be coupled with a memory configured to store the detected events and a sort decision based thereon. The sort decision can be included in the event data for a particle. In some implementations, the detection system 716 and the detection station 714 can be implemented as a single detection unit or communicatively coupled such that an event measurement can be collected by one of the detection system 716 or the detection station 714 and provided to the non-collecting element.

Figure 7B:
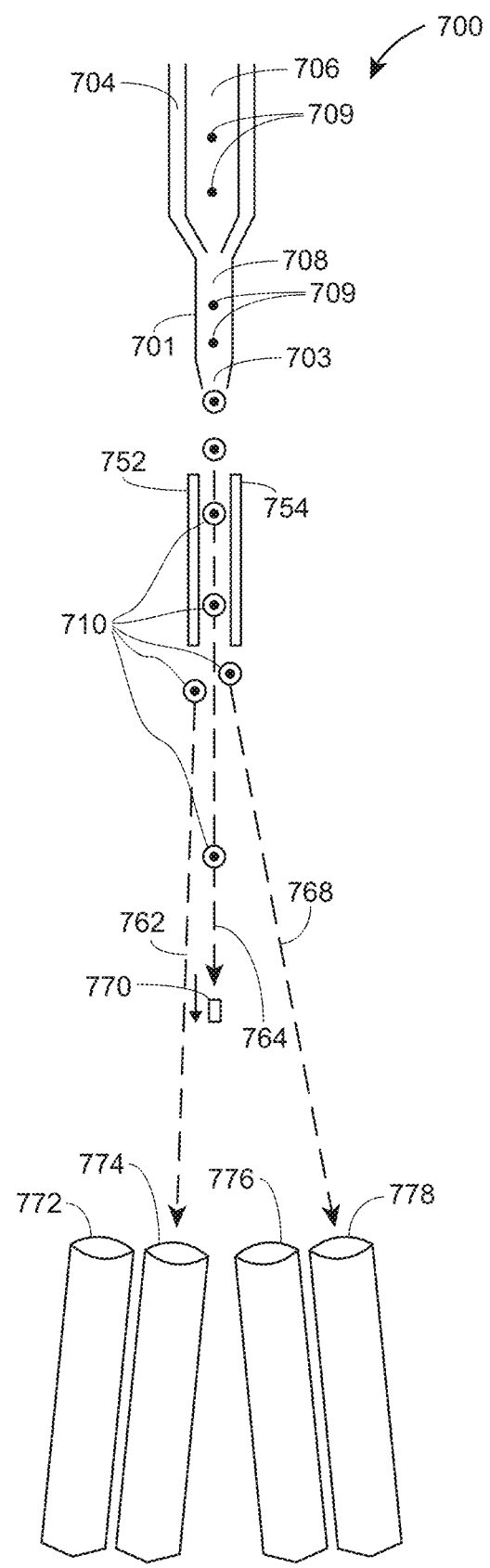
FIG. 7B depicts a schematic drawing of a particle sorter system according to certain embodiments.

FIG. 7B is a schematic drawing of a particle sorter system, in accordance with one embodiment presented herein. The particle sorter system 700 shown in FIG. 7B, includes deflection plates 752 and 754. A charge can be applied via a stream-charging wire in a barb. This creates a stream of droplets 710 containing particles 710 for analysis. The particles can be illuminated with one or more light sources (e.g., lasers) to generate light scatter and fluorescence information. The information for a particle is analyzed such as by sorting electronics or other detection system (not shown in FIG. 7B). The deflection plates 752 and 754 can be independently controlled to attract or repel the charged droplet to guide the droplet toward a destination collection receptacle (e.g., one of 772, 774, 776, or 778). As shown in FIG. 7B, the deflection plates 752 and 754 can be controlled to direct a particle along a first path 762 toward the receptacle 774 or along a second path 768 toward the receptacle 778. If the particle is not of interest (e.g., does not exhibit scatter or illumination information within a specified sort range), deflection plates may allow the particle to continue along a flow path 764. Such uncharged droplets may pass into a waste receptacle such as via aspirator 770.

The sorting electronics can be included to initiate collection of measurements, receive fluorescence signals for particles, and determine how to adjust the deflection plates to cause sorting of the particles. Example implementations of the embodiment shown in FIG. 7B include the BD FACSAria™ line of flow cytometers commercially provided by Becton, Dickinson and Company (Franklin Lakes, NJ).

Methods for Analyzing a Sample

Aspects of the invention further include methods of analyzing a sample. Embodiments of the subject methods include introducing the sample into a flow cytometer that includes a flow cell for transporting particles in a flow stream, a light source for irradiating the particles in the flow stream at an interrogation point, an objective lens for focusing particle-modulated light propagating within a first light collection cone, and a light collection enhancer. Light collection enhancers of interest in the instant methods are configured to collect particle-modulated light propagating along an optical path within a second light collection cone and redirect the collected light such that it is back-propagated along the same optical path and focused by the objective lens.

The sample analyzed can be any sample that is of interest to a user. In certain embodiments, the sample contains a biological component, or is a biological sample. The term "biological sample" is used in its conventional sense to refer to a sample derived from or containing a whole organism, e.g., a prokaryotic cells, eukaryotic cells, plants, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to: a homogenate; isolated, purified or enriched biological particles (e.g., DNA, RNA, proteins, sub-cellular organelles, etc.); and lysates or extracts prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While embodiments of the present disclosure may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing methods according to certain embodiments, a sample (e.g., in a flow stream of a flow cytometer) is irradiated with light from a light source. Any convenient light source may be employed. In some instances, methods include the irradiation of a flow cell with a laser. In certain embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, CO2 laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, lasers for practicing the subject methods include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, lasers for practicing the subject methods include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof. In some embodiments, methods include irradiating the sample with light produced by low-power lasers. In some instances, increases in light collection efficiency resulting from the light collection enhancer permits the use of low-power lasers. In some embodiments, flow cytometers having light collection enhancers and low-power lasers are less expensive and consume less energy. In additional embodiments, flow cytometers having light collection enhancers and low-power lasers may be more compact due to the smaller weight and size of the low-power lasers.

As discussed above, methods include collecting particle-modulated light propagating within first and second light collection cones. The first light collection cone may be any convenient size. In some embodiments, the subject first light collection cone is defined by an apex angle ranging from less than 1 degrees to 120 degrees, such as 50 degrees to 120 degrees, and including 100 degrees to 120 degrees. In certain cases, the first light collection is defined by an apex angle of 120 degrees. In some embodiments, the size of the first collection cone may be determined by the size (e.g., diameter) of the objective lens. For example, optical systems having a large objective lens may increase the amount of particle-modulated light collected by creating a first light collection cone having a wider apex angle. The size of the first collection cone may also be determined by the distance separating the flow cell and the objective lens. For example, optical systems having a short distance separating the flow cell and the objective may increase the amount of particle-modulated light collected by creating a first light collection cone having a wider apex angle.

In certain embodiments, methods include collecting via a light collection enhancer particle-modulated light propagating within a second light collection cone and redirecting the collected light such that it is also focused by the objective lens (i.e., in addition to the particle-modulated light propagating within the first light collection cone). Accordingly, the second light collection cone includes particle-modulated light propagating away from the flow cell in a second direction that is distinct from the first direction in which particle-modulated light within the first light collection cone propagates. The subject second light collection cone may be defined by any convenient apex angle. in some embodiments, the second light collection cone is defined by an apex angle ranging from less than 1 degrees to 120 degrees, such as 50 degrees to 120 degrees, and including 100 degrees to 120 degrees. In certain embodiments, the second light collection cone is defined by an apex angle ranging from 20 degrees to 100 degrees. In still further instances, the second light collection cone is defined by an apex angle of 45 degrees. In some cases, the second light collection cone is the same size as the first light collection cone. In other cases, the second light collection cone is smaller than the first light collection cone.

In some instances, the light collection enhancer increases the total amount of particle-modulated light collected from the flow cell. For example, in some embodiments, the subject light collection enhancers may redirect particle-modulated light propagating within the second light collection cone such that the total amount of particle-modulated light collected from the flow cell may increase by less than 1% to 100%, such as 20% to 99%, and including 30% to 50%. In some cases, the increase of the total amount of particle-modulated light is proportional to the size of the second light collection cone relative to the first light collection cone. For example, where the second collection cone and the first collection cone are the same size, the subject light collection enhancer may increase the total amount of collected light by 100%, effectively doubling the total amount of particle-modulated light collected. Consequently, the light collection enhancer may be configured to collect particle-modulated light within a second light collection cone that would otherwise remain uncollected and undetected by the flow cytometer. Light collection enhancers of interest may therefore increase the amount of signal detected and thereby improve the signal to noise ratio. By "noise" it is meant irrelevant and compromised signals in flow cytometry data resulting from operational change in the laser (i.e., changes in laser light intensity). In certain cases, therefore, the subject light collection enhancers may increase the quality of flow cytometer data by increasing the amount of particle-modulated light signal detected relative to noise.

In some embodiments, the light collection enhancer and corresponding second light collection cone are located on the opposite side of the flow cell with respect to the objective lens and first collection cone. In such embodiments, the light collection enhancer redirects the particle-modulated light propagating within the second light collection cone such that the light is back-propagated to the flow cell. The back-propagated light subsequently passes through the interrogation point of flow cell and is thereby directed to the objective lens so that it can be focused and detected. In other words, particle-modulated light within the second light collection cone that has been redirected by the light collection enhancer through the interrogation point of the flow cell is focused by the objective lens along with the particle-modulated light propagating within the first light collection cone.

Aspects of the light collection enhancer include a reflective optical element for redirecting the collected light such that it is focused by the objective lens. Any convenient optical element for reflecting light may be used as the reflective optical element described herein. In certain instances, the reflective optical element includes a mirror. In other embodiments, the reflective optical element includes a series of mirrors. In certain instances, the reflective optical element is comprised of one or more flat mirrors. The flat mirror described herein possesses a planar reflective surface where the angle of reflection is equal to the angle of irradiance (i.e., the mirror possesses a focal length of infinity). In additional embodiments, the reflective optical element is configured to invert the wavefront of redirected particle-modulated light propagating within the second light collection cone. In some cases, the inverted wavefront of back-propagating particle-modulated light prevents optical interference with light propagating away from the flow cell in the second light collection cone and/or the first light collection cone. The reflective optical element may be positioned at any convenient distance relative to the flow cell. For example, in some embodiments, the reflective optical element is separated from the flow cell by a distance ranging from greater than 0 mm to 100 mm (e.g., 0.1 mm to 100 mm), such as 20 mm to 80 mm, and including 30 mm to 60 mm. In some cases, the subject reflective optical element is achromatic. In these cases, the reflective optical element does not separate particle-modulated light into beams of different wavelengths/colors.

Aspects of the light collection enhancer also include a condenser lens positioned between the reflective optical element and the flow cell. As discussed above, light emitted from a particle passing through the flow cell propagates in all directions. The subject condenser lens, therefore, collects such divergent rays of light propagating within the second light collection cone and collimates the rays such that they travel parallel relative to one another. In addition to collimating the beams, the subject condenser lens directs particle-modulated light propagating within the second light collection cone to the reflective optical element. In certain cases, the reflective optical element is positioned to reflect the particle-modulated light such that the light is back-propagated to the condenser lens. Following its return to the condenser lens, in certain cases, the back-propagated particle-modulated light is focused by the condenser lens onto the interrogation point of the flow cell such that the light is focused by the objective lens (e.g., as discussed above). In some cases, the subject condenser lens is achromatic. In these cases, the condenser lens does not separate particle-modulated light into beams of different wavelengths/colors.

In cases where the light collection enhancer is positioned on the opposite side of the flow cell relative to the objective lens, the condenser lens may be positioned along the same optical axis as the objective lens. In such instances, an imaginary straight line passes through the center of the collimator lens, the interrogation point of the flow cell, and the center of the objective lens. In some embodiments, the size of the second collection cone may be determined by the size (e.g., diameter) of the condenser lens. For example, optical systems having a large condenser lens may increase the amount of particle-modulated light collected by creating a second light collection cone having a wider apex angle. The size of the second collection cone may also be determined by the distance separating the flow cell and the objective lens. For example, optical systems having a short distance separating the flow cell and the objective may increase the amount of particle-modulated light collected by creating a first light collection cone having a wider apex angle. In embodiments, the subject condenser lens is separated from the flow cell by a distance ranging from greater than 0 mm to 50 mm (e.g., 0.1 mm to 50 mm), such as 5 mm to 30 mm, and including 10 mm to 20 mm. Additionally, the reflective optical element may be separated from the condenser lens by a distance ranging from greater than 0 mm to 20 mm (e.g., 0.1 mm to 20 mm), such as 3 mm to 15 mm, and including 5 mm to 10 mm.

In additional aspects of the invention, methods include collecting particle-modulated light propagating along an optical path within a second light collection cone and redirecting the collected light such that it is back propagated along the same optical path before it passes through the interrogation point of the flow cell and is focused by the objective lens. Put another way, different rays of light propagating within the second light collection cone follow particular optical paths as they travel through the light collection enhancer. In embodiments, the light collection enhancer redirects the particle-modulated light such that it travels along the same optical path it had traveled before being redirected. In these embodiments, the light collection enhancer may be configured such that the condenser lens projects collimated beams of particle-modulated light onto a reflective optical element that includes a flat mirror. It may be desirable in such instances for the condenser lens to collimate the beams of particle-modulated light such that they propagate along an optical path that is normal relative to the flat mirror. Because the flat mirror possesses a planar reflective surface where the angle of reflection is equal to the angle of irradiance, particle-modulated light is back-reflected to the condenser along the same optical path as it is refocused by the condenser lens and directed to the interrogation point of the flow cell.

As discussed above, methods also include focusing particle-modulated light onto a light detector via an objective lens. Objective lenses of interest for focusing particle-modulated light propagating within a first light collection cone may include one or a combination of a collimating lens, a focusing lens, a magnifying lens, a de-magnifying lens, or other lens, that are configured to receive light from a detection zone of a flow cell and produce imaged light that is transmitted to one or more.

Where the particle-modulated light includes side-scattered light, methods may include detecting the side-scattered light with a side-scattered light detector. The number of side-scattered light detectors in the subject methods may vary, as desired. For example, the subject methods may involve 1 side-scattered light detector or multiple side-scattered light detectors, such as 2 or more, such as 3 or more, such as 4 or more, and including 5 or more. In certain embodiments, methods include 1 side-scattered light detector. In other embodiments, methods include 2 side-scattered light detectors.

Where the particle-modulated light includes fluorescent light, methods may include detecting the fluorescent light with a fluorescent light detector. The number of fluorescent light detectors in the subject methods may vary, as desired. For example, the subject methods may involve 1 fluorescent or multiple side-scattered light detectors, such as 2 or more, such as 3 or more, such as 4 or more, such as 5 or more, such as 6 or more, such as 7 or more, such as 8 or more, such as 9 or more and including 10 or more. In certain embodiments, methods include 3 fluorescent light detectors. In other embodiments, methods include 6 fluorescent light detectors.

In embodiments, methods include detecting forward scattered light with a forward scatter detector. The number of forward scatter detectors in the subject methods may vary, as desired. For example, the subject methods may involve 1 forward scatter detector or multiple forward scatter detectors, such as 2 or more, such as 3 or more, such as 4 or more, and including 5 or more. In certain embodiments, methods include 1 forward scatter detector. In other embodiments, methods include 2 forward scatter detectors.

In embodiments, the light detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Methods of Assembling a Flow Cytometer

As discussed above, methods for assembling a flow cytometer are also provided. In embodiments, methods include positioning a light collection enhancer (e.g., such as those described above) within a flow cytometer. In some embodiments, methods include positioning the light collection enhancer on the opposite side of the flow cell relative to the objective lens. Embodiments of the instant methods also include optically aligning the light collection enhancer with the objective lens of the flow cytometer to assemble the flow cytometer. By "optically aligning" it is meant adjusting the position of the light collection enhancer relative to the flow cell and the objective lens such that the elements are in proper optical communication. In some embodiments, optically aligning the light collection enhancer and the objective lens includes positioning a condenser lens of the light collection enhancer along the same optical axis as the objective lens. Methods may also include positioning a reflective optical element of the light collection enhancer within the flow cytometer. In certain cases, the reflective optical element is a flat mirror. Accordingly, methods may include positioning the reflective optical element within the flow cytometer such that particle-modulated light propagating within the second light collection cone is collimated by the condenser lens and contacts the reflective optical element in beams that are normal relative to the surface of the reflective optical element.

Methods of interest may further include positioning a light collection enhancer within an existing flow cytometer, i.e., a flow cytometer that is already in use. In some instances, the light collection enhancer is modular such that the light collection enhancer can be removed from and reattached to the flow cytometer as desired. In embodiments, the light collection enhancer is surrounded by a housing inside which the reflective optical element and the condenser lens are affixed. In some embodiments, the location of the reflective optical element and condenser lens within a modular housing reduces the need for manual optical alignment of these components with the objective lens and flow cell.

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for processing flow cytometer data collected by a flow cytometer that includes a flow cell for transporting particles in a flow stream, a light source for irradiating the particles in the flow stream at an interrogation point, an objective lens for focusing particle-modulated light propagating within a first light collection cone, and a light collection enhancer configured to collect particle-modulated light propagating along an optical path within a second light collection cone and redirect the collected light such that it is back-propagated along the same optical path and focused by the objective lens.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python and other high level or low level languages, as well as combinations thereof, as is known in the art. The operating system, typically in cooperation with the processor, coordinates and executes functions of the other components of the computer. In some embodiments, the subject computer programs include flow cytometer data analysis software, such as FlowJo®. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, Windows 10, iOS, macOS, Linux, OS/400, Android, SGI IRIX, Siemens Reliant Unix, and others.

Figure 8:
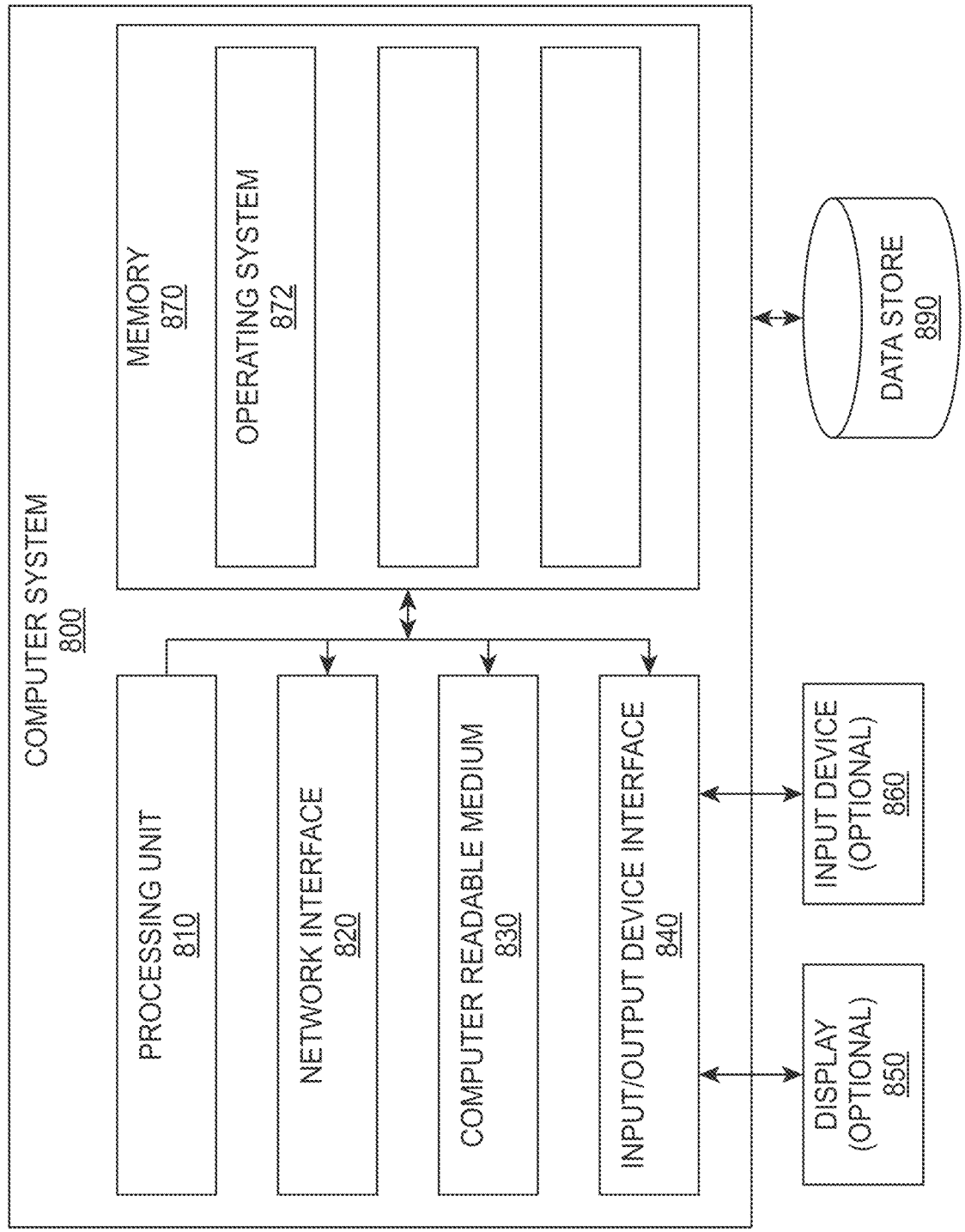
FIG. 8 depicts a block diagram of a computing system according to certain embodiments.

FIG. 8 depicts a general architecture of an example computing device 800 according to some embodiments. The general architecture of the computing device 800 depicted in FIG. 8 includes an arrangement of computer hardware and software components. The computing device 800 may include many more (or fewer) elements than those shown in FIG. 8. It is not necessary, however, that all of these generally conventional elements be shown in order to provide an enabling disclosure. As illustrated, the computing device 800 includes a processing unit 810, a network interface 820, a computer readable medium drive 830, an input/output device interface 840, a display 850, and an input device 860, all of which may communicate with one another by way of a communication bus. The network interface 820 may provide connectivity to one or more networks or computing systems. The processing unit 810 may thus receive information and instructions from other computing systems or services via a network. The processing unit 810 may also communicate to and from memory 870 and data store 890 and further provide output information for an optional display 850 via the input/output device interface 840. The input/output device interface 840 may also accept input from the optional input device 860, such as a keyboard, mouse, digital pen, microphone, touch screen, gesture recognition system, voice recognition system, gamepad, accelerometer, gyroscope, or other input device.

The memory 870 may contain computer program instructions (grouped as modules or components in some embodiments) that the processing unit 810 executes in order to implement one or more embodiments. The memory 870 generally includes RAM, ROM and/or other persistent, auxiliary or non-transitory computer-readable media. The memory 870 may store an operating system 872 that provides computer program instructions for use by the processing unit 810 in the general administration and operation of the computing device 800. The memory 870 may further include computer program instructions and other information for implementing aspects of the present disclosure.

Utility

The subject flow cytometers and methods find use in a variety of applications where it is desirable to increase resolution and accuracy in the determination of parameters for particles in a biological sample. For example, the present disclosure finds use in accurately determining parameters regarding particle morphology such as diameter as well as surface and internal structure of the particle. By collecting particle-modulated light within a second light collection cone that would otherwise remain uncollected and undetected, the subject flow cytometers and methods may also increase the amount of signal detected and thereby improve the signal to noise ratio. In certain cases, therefore, the subject flow cytometers find use where it is desirable to increase the quality of flow cytometer data by increasing the amount of particle-modulated light signal detected relative to noise.

Furthermore, the present disclosure finds use where it is desirable to decrease the size, complexity and cost in the manufacturing and operation of flow cytometers. As discussed above, the subject light collection enhancers may increase the total amount of particle-modulated light by collecting light within a second light collection cone that would otherwise have been lost to the system. Because the light collection enhancers increase the amount of particle-modulated light, the subject flow cytometers and methods may permit the use of smaller, less complex and less expensive lasers for sample irradiation. In embodiments, the use of such low-power lasers in conjunction with the light collection enhancer described herein may decrease the overall size and complexity of the flow cytometer. In addition, because low-power lasers consume less energy, the present disclosure may be employed to reduce operational costs of flow cytometry.

In embodiments, the present disclosure reduces the need for user input or manual adjustment during sample analysis with a flow cytometer. In some embodiments, the subject methods and systems provide fully automated protocols so that adjustments to flow cytometer data during use require little, if any, human input.

The present disclosure can be employed to characterize many types of analytes, in particular, analytes relevant to medical diagnosis or protocols for caring for a patient, including but not limited to: proteins (including both free proteins and proteins and proteins bound to the surface of a structure, such as a cell), nucleic acids, viral particles, and the like. Further, samples can be from in vitro or in vivo sources, and samples can be diagnostic samples.

Kits

Kits including one or more components of the subject flow cytometers are also provided. Kits according to certain embodiments include one or more light source components, such as one or more continuous wave lasers. In certain cases, kits include one or more low-power lasers. In some instances, kits include one or more objective lenses for focusing particle-modulated light within a first light collection cone. In addition, kits of interest include one or more light collection enhancers configured to collect particle-modulated light propagating along an optical path within a second light collection cone and redirect the collected light such that it is back-propagated along the same optical path and focused by the objective lens. As such, kits may include one or more reflective optical elements (e.g., mirrors) and one or more condenser lenses The various components of the kits may be present in separate containers, or some or all of them may be pre-combined/assembled. In embodiments of the invention where the subject light collection enhancer is modular, kits may include a reflective optical element and condenser lens surrounded by a housing. In some embodiments, the location of the reflective optical element and condenser lens within a modular housing reduces the need for manual optical alignment of these components with the objective lens and flow cell.

In addition to the above components, the subject kits may further include (in some embodiments) instructions, e.g., for adding above components to a flow cytometer or using a flow cytometer having a light collection enhancer according to aspects of the subject invention. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A flow cytometer comprising:
   a light source for irradiating particles at an interrogation point in a flow stream; and
   a light collection enhancer configured to collect particle-modulated light from the interrogation point and back-propagate the collected light.

2. The flow cytometer according to claim 1, wherein the light collection enhancer comprises:
   a reflective optical element; and
   a condenser lens.

3. The flow cytometer according to claim 2, wherein the condenser lens collimates the particle-modulated light.

4. The flow cytometer according to claim 2, wherein the reflective optical element comprises a mirror.

5. The flow cytometer according to claim 2, wherein the condenser lens directs the particle-modulated light to the reflective optical element.

6. The flow cytometer according to claim 2, wherein the reflective optical element reflects the particle-modulated light such that the light is back-propagated to the condenser lens.

7. The flow cytometer according to claim 6, wherein the reflective optical element is configured to invert the wavefront of the back-propagated particle-modulated light.

8. The flow cytometer according to claim 6, wherein the condenser lens is configured to focus the back-propagated particle-modulated light onto the interrogation zone.

9. The flow cytometer according to claim 2, further comprising a light detector configured to receive back-propagated collected light.

10. The flow cytometer according to claim 9, further comprising an objective lens.

11. The flow cytometer according to claim 10, wherein the objective lens is positioned between the light detector and the light collection enhancer.

12. The flow cytometer according to claim 11, wherein the condenser lens is positioned along the same optical axis as the objective lens.

13. The flow cytometer according to claim 12, further comprising a flow cell positioned between the condenser lens and the objective lens.

14. The flow cytometer according to claim 1, wherein the light collection enhancer is detachable.

15. The flow cytometer according to claim 1, wherein the particle-modulated light comprises fluorescent light.

16. The flow cytometer according to claim 1, wherein the particle-modulated light comprises side-scattered light.

17. The flow cytometer according to claim 1, wherein the light source comprises a laser.

18. A flow cytometer comprising:
   a light source for irradiating particles at an interrogation point in a flow stream;
   an objective lens for focusing particle-modulated light received from the interrogation point; and
   a light collection enhancer configured to collect particle-modulated light from the interrogation point and back-propagate the collected light along the same optical path focused by the objective lens.

19. The flow cytometer according to claim 18, wherein the light collection enhancer comprises:
   a reflective optical element; and
   a condenser lens positioned between the reflective optical element and the flow cell.

20. The flow cytometer according to claim 19, wherein the condenser lens is positioned along the same optical axis as the objective lens.

* * * * *